United States Patent Office 2,904,476
Patented Sept. 15, 1959

2,904,476
ELECTROLYTIC PREPARATION OF SULFUR HEXAFLUORIDE

Eugene H. Man, Newark, Del., assignor to E. I. du Pont de Nemours and Company, Wilmington, Del., a corporation of Delaware No Drawing. Application October 31, 1957
Serial No. 693,518

5 Claims. (Cl. 204—59)

This invention relates to the synthesis of sulfur hexafluoride ($SF_6$) and has as its chief object the provision of a novel synthesis of this compound by the electrolysis of sulfur tetrafluoride.

Sulfur hexafluoride is a highly inert, colorless, odorless gas. It is unaffected below a red heat by contact with a variety of chemicals, including oxygen, copper, magnesium and other metals. It is decomposed only slowly even by a powerful electric discharge, either alone or when mixed with oxygen. By virtue of its great resistance to attack, sulfur hexafluoride is employed commercially as an inert blanketing material for electrical equipment, e.g., as a gaseous dielectric in transformers.

Sulfur hexafluoride may be prepared by the direct combination of the elements. However, this method of preparation requires the handling of elemental fluorine and less troublesome procedures have been sought. Electroylsis of inorganic covalent sulfur compounds such as hydrogen sulfide, carbon disulfide and sulfur monochloride in the presence of anhydrous hydrogen fluoride and a conductivity-promoting solute such as sodium fluoride has been proposed in U.S. Patent 2,717,235. This process is carried out at cell voltages below those which lead to the generation of free fluorine. In view of the commercial utility of sulfur hexafluoride, new syntheses employing other raw materials are a desirable goal.

A novel process for synthesizing hexavalent sulfur fluoride has now been found which comprises electrolyzing with direct current at a potential of at least about 8 volts a liquid mixture of hydrogen fluoride and sulfur tetrafluoride. To this electrolysis will generally be added the step of separating the sulfur hexafluoride produced at the anode.

This new process is carried out at voltages above those sufficient to generate free fluorine from hydrogen fluoride. The theoretical voltage for the production of fluorine from hydrogen fluoride is 2.77 volts; in practice, potentials in the neighborhood of 6–8 volts are required (see Simons "Fluorine Chemistry," Academic Press, New York, vol. I, p. 295). The present process can be carried out at voltages ranging upwards to 75 volts or more. It is desirable, however, to employ lower voltages to prevent polarization effects, and voltages in the range of 25–50 volts are preferred. The presence of a current-carrying electrolyte such as a metal salt is unnecessary. In spite of the fact that the electrolysis is carried out at voltages which, in the absence of sulfur tetrafluoride, would be sufficient to generate free fluorine from hydrogen fluoride, elemental fluorine is not detected under the conditions of the present process.

The electrolysis of sulfur tetrafluoride in the presence of hydrogen fluoride is carried out at temperatures below 0° C. to maintain the reactants in the liquid phase. The temperature is usually below −20° C. and preferably below −40° C. If desired, a moderate superatmospheric pressure may be applied to the reaction system for convenience of operation and to prevent access of air and moisture. However, it is preferred to operate at atmospheric pressure to avoid undue complexity in the equipment required.

For best results, the reactants employed in the practice of this invention should be anhydrous and free from contamination. It is especially desirable to avoid the presence of halogens other than fluorine since these impurities adversely affect the process and the product of this invention. Hydrogen fluoride can be the commercial so-called anhydrous product which contains traces of water and usually small amounts (0.1–0.5%) of sulfur dioxide. Sulfur tetrafluoride can be prepared by any of the known methods and is desirably purified before use as by distillation.

The molar proportions of sulfur tetrafluoride and hydrogen fluoride may range from about 1:2 to about 10:1. The stoichiometric relationship requires 2 moles of hydrogen fluoride for the conversion of 1 mole of sulfur tetrafluoride to sulfur hexafluoride. However, it is desirable that one of the reactants be present in excess to serve as a reaction medium. Either sulfur tetrafluoride or hydrogen fluoride may be so employed, but sulfur tetrafluoride is preferred. The molar ratio of sulfur tetrafluoride to hydrogen fluoride is preferably in the range of 1:1 to 5:1. The electrolysis may be carried out as a batch operation or additional quantities of reactants may be introduced during the course of the electrolysis at a rate approximately equivalent to the rate at which they are consumed, thus providing continuous operation.

Any suitably designed electrolytic cell can be employed for the preparation of sulfur hexafluoride by the electrolysis of sulfur tetrafluoride/hydrogen fluoride mixtures. The cell used in the example which follows consists of a cylindrical nickel vessel which serves as the cathode. This vessel is fitted with a polytetrafluoroethylene threaded top provided with a gas inlet tube. At the center of the top is supported a nickel cylinder which serves as the anode. The cell is fitted with a stainless steel reflux condenser through the jacket of which a cold liquid is circulated to condense reactant vapors and return them to the electrolysis cell. Following this condenser, the effluent gases pass through a sodium fluoride tower which removes the last traces of hydrogen fluoride. The products are then condensed in successive traps cooled with dry ice and liquid nitrogen from which they are transferred to stainless steel cylinders for storage. Alternatively, the product gas before condensation may be collected in gas sampling tubes for analysis. A slow stream of nitrogen is passed through the cell to sweep the reaction products into the collecting vessels. Other types of apparatus and other materials of construction which are inert to the reactants and products can be used. It is necessary, of course, that the electrodes be substantially insoluble in the electrolyte.

As noted above, voltages in the range of 8–75 volts or more may be employed. The most desirable range of potential is between 25 and 50 volts under which conditions a direct current of ½ to 2 amperes passes through the cell.

The composition of the reaction products is determined by analysis of the cylinder contents or samples of effluent gas collected directly from the electrolysis without prior condensation. This latter method permits the determination of constituents not condensed at liquid nitrogen temperatures. Infrared and mass spectrometric methods of analysis are conveniently employed.

Analyses of the reaction products indicate that sulfur hexafluoride and unchanged sulfur tetrafluoride are the main constituents of the product gases. In addition, there are present small amounts of $SOF_4$, $SiF_4$, $SOF_2$, $H_2$, and $CO_2$. With the exception of hydrogen, which is a product of electrolysis, these impurities are present as contaminants in the starting materials used, or result from reaction of sulfur tetrafluoride with traces of water inadvertently admitted to the system.

The sulfur hexafluoride contained in the reaction product can be separated readily from the other constituents by fractionation in a low temperature still. To simplify the purification procedure, it is desirable that the reactants employed be pure and that anhydrous oxygen-free conditions be maintained throughout the electrolysis and collection of products. Sulfur hexafluoride of purity sufficient for practically all purposes can be isolated simply by passing the crude gaseous reaction product through an aqueous alkaline solution which decomposes and absorbs substantially all the other compounds present, but leaves the sulfur hexafluoride unaffected.

The process of this invention is illustrated by the following example in which an electrolytic cell of the type described above is employed. The composition of the reaction products is determined by infrared and mass spectroscopy of both the gaseous and the liquid portions present in the cylinder containing the condensed reaction product. This is done by taking samples from the cylinder in the upright position (gas) and in the inverted position (liquid). Values are shown for each component of the product in both gaseous and liquid phases; however, the principal weight of product is present as liquid. Pressure during the runs reported is essentially ambient atmospheric, i.e., about 760 mm. of mercury.

Example (a) An electrolytic cell, as described above, is carefully dried, purged with nitrogen, and surrounded by a cooling bath containing a mixture of Dry Ice and acetone. A copper coil also immersed in the bath is used to cool methanol which circulates to the jacket of the stainless steel condenser. Sulfur tetrafluoride (270 g.) and hydrogen fluoride (20 g.) are condensed into the cell from storage cylinders. A direct current of 0.5–1.1 amperes at 34–72 volts is passed for 7.8 ampere hours (0.29 Faraday). After removal of hydrogen fluoride from the product gas by passage through a sodium fluoride tower, a total of 47 g. of liquifiable product is collected in the traps and distilled into a stainless steel cylinder. Mass spectrometric analysis of a portion of this product gives the following results:

| Compound | Liquid composition (mole percent) | Gas composition (mole percent) |
| --- | --- | --- |
| $SF_6$ | 23.3 | 41.9 |
| $SF_4$ | 64.4 | 41.9 |

Impurities introduced as noted above account for the remainder of this analysis.

Based on a consumption of 0.29 Faraday of electricity, the 23.3 mole percent of sulfur hexafluoride in the liquid phase represents a current efficiency of 70% of theory. Infrared analysis, also carried out on the product from the gas phase, confirms the presence of sulfur hexafluoride in a concentration of 40–50 percent.

The remaining content of the cylinder is subjected to treatment with aqueous caustic and finally distilled to yield sulfur hexafluoride of high purity.

(b) The run of (a) is substantially repeated except that a higher $SF_4$/HF ratio is employed (270 g. of $SF_4$; 10 g. of HF), with substantially equivalent results.

Since obvious modifications in my invention will occur to those skilled in the art, I propose to be bound solely by the appended claims.

The embodiments of the invention in which an exclusive property or privilege is claimed are defined as follows.

I claim:

1. The method of preparing sulfur hexafluoride in an electrolytic cell with an insoluble anode which comprises passing a direct current at a potential of at least about 8 volts through a substantially anhydrous liquid mixture of sulfur tetrafluoride and hydrogen fluoride.

2. The method of claim 1 in which the potential is about 25–50 volts.

3. The method of claim 1 accomplished at a temperature below 0° C.

4. The method of claim 1 accomplished at a temperature below −20° C.

5. The method of claim 1 in which the molar ratio $SF_4$:HF ranges from about 1:2 to 10:1.

References Cited in the file of this patent

UNITED STATES PATENTS 2,717,235    Prober _____ Sept. 6, 1955